(12) United States Patent
Gladkov

(10) Patent No.: US 8,192,522 B2
(45) Date of Patent: Jun. 5, 2012

(54) CHEMICAL PROCESS FOR GENERATING ENERGY

(75) Inventor: Petr Gladkov, Toronto (CA)

(73) Assignee: ET-Energy Corp., Mississauga, Ontario (CA)

(*) Notice: Subject to any disclaimer, the term of this patent is extended or adjusted under 35 U.S.C. 154(b) by 372 days.

(21) Appl. No.: 12/411,551

(22) Filed: Mar. 26, 2009

(65) Prior Publication Data
US 2009/0241730 A1 Oct. 1, 2009

Related U.S. Application Data

(60) Provisional application No. 61/041,036, filed on Mar. 31, 2008.

(51) Int. Cl.
*C22B 26/22* (2006.01)
*C01B 33/023* (2006.01)
*C01B 33/04* (2006.01)

(52) U.S. Cl. ............ 75/596; 423/347; 423/335; 423/337

(58) Field of Classification Search .................. 75/596
See application file for complete search history.

(56) References Cited

U.S. PATENT DOCUMENTS

| | | | |
|---|---|---|---|
| 4,648,954 A * | 3/1987 | Henslee et al. ............ 204/247.3 |
| 4,698,218 A | 10/1987 | Belot et al. | |
| 4,704,264 A * | 11/1987 | Harada ........................ 423/347 |
| 5,178,844 A | 1/1993 | Carter et al. | |
| 5,562,690 A | 10/1996 | Green et al. | |
| 5,665,220 A * | 9/1997 | Sharma ........................ 205/359 |
| 5,775,096 A | 7/1998 | Plichta | |
| 5,996,332 A | 12/1999 | Plichta | |
| 6,027,705 A | 2/2000 | Kitsuno et al. | |
| 6,209,457 B1 | 4/2001 | Kenworthy et al. | |
| RE37,441 E | 11/2001 | Yamazaki | |
| 6,346,716 B1 | 2/2002 | Yamazaki | |
| 6,379,994 B1 | 4/2002 | Sano et al. | |
| 6,436,356 B1 | 8/2002 | Kopyt | |
| 6,736,069 B2 | 5/2004 | Kim | |
| 2003/0101850 A1 | 6/2003 | Vadshenko et al. | |
| 2004/0063052 A1 | 4/2004 | Plichta | |
| 2004/0074470 A1 | 4/2004 | Plichta | |
| 2004/0151664 A1 | 8/2004 | Auner | |

(Continued)

FOREIGN PATENT DOCUMENTS
DE 2139155 2/1973
(Continued)

OTHER PUBLICATIONS

H.N. Acharya et al., "Production of Magnesium Silicide and Silane from Rice Husk Ash", 1980 (no month), Solar Energy Materials 3, pp. 441-445.*

(Continued)

*Primary Examiner* — George Wyszomierski
*Assistant Examiner* — Tima M McGuthry Banks
(74) *Attorney, Agent, or Firm* — Bereskin & Parr LLP/S.E.N.C.R.L.,s.r.l.

(57) ABSTRACT

A process for generating energy comprises process comprises exothermically reacting Mg with $SiO_2$ to yield at least $Mg_2Si$ and Si; b)reacting the $Mg_2Si$ to yield at least lower silanes, and at least one magnesium product; c) generating at least higher silanes from at least a portion of the lower silanes; d) combusting the higher silanes and the Si to yield at least one silicon product.

22 Claims, 4 Drawing Sheets

U.S. PATENT DOCUMENTS

| | | | |
|---|---|---|---|
| 2005/0133084 | A1 | 6/2005 | Joge et al. |
| 2006/0141414 | A1* | 6/2006 | Harada et al. .................. 431/354 |
| 2007/0202029 | A1 | 8/2007 | Burns et al. |

FOREIGN PATENT DOCUMENTS

| | | |
|---|---|---|
| JP | 60-141613 | 7/1985 |
| JP | 62-132720 | 6/1987 |
| JP | 62-132721 | 6/1987 |
| JP | 03-183613 | 8/1991 |
| JP | 03-183614 | 8/1991 |

OTHER PUBLICATIONS

K.C. Nandi et al., "A novel and inexpensive method of production of silanes from rice husk and their gas chromatographic anlyses", 1991 (no month), Solar Energy Materials 22, pp. 161-167.*

Margaret S. Wooldridge et al., "Demonstration of gas-phase combustion synthesis of nanosized particles using a hybrid burner", 1999 (no month), NanoStructured Materials, Vil. 11, No. 7, pp. 955-964.*

H. Remy, "Treatise on inorganic chemistry", 1956 (2nd reprint 1960), Elsevier Publishing Company, vol. I, pp. 236, 244-247.*

David R. Gaskell, "Introduction to Metallurgical Thermodynamics" 2nd Edition, 1981 (no month) McGraw-Hill Book Company, pp. 261-267 and 287.*

B. Terry, "The acid decomposition of silicate minerals Part I. Reactivities and modes of dissolution of silicates", 1983 (no month), Hydrometallurgy 10 pp. 135-150.*

Duncan H. Gregory, "Nitride chemistry of the s-block elements", 2001 (no month), Coordination Chemistry Review 215, pp. 301-345.*

International Search Report and Written Opinion, mailed Jun. 25, 2009.*

Horvath, P., Rozsa, K., and Gallagher, A. Polysilane Production in RF SiH4 and H2-SiH2 Plasmas. 2003.*

Brochure entitled Self-Propagating High-Temperature Synthesis (SHS) by A.G. Merzhanov. 1983.*

Brochure entitled Self-Propagating High-Temperatuer Synthesis (SHS) by A.G. Merzhanov.

* cited by examiner

US 8,192,522 B2

CHEMICAL PROCESS FOR GENERATING ENERGY

CROSS REFERENCES TO RELATED APPLICATIONS

This application claims priority from U.S. provisional application 61/041,036, filed on Mar. 31, 2008, which is incorporated herein by reference in its entirety.

FIELD

The specification relates to chemical processes, and more particularly, chemical processes which generate energy using inorganic sources.

INTRODUCTION

The following is not an admission that anything discussed below is prior art or part of the common general knowledge of persons skilled in the art.

United States Patent application Publication No. 2004/0063052 discloses an energy concept that relates to an artificial silicon-nitrogen cycle and that constitutes the complement to the natural carbon-oxygen cycle. Pure silicon is produced from sand using solar energy. By repeated Muller-Rochow synthesis with silylchlorides the silicon is converted to higher silanes. The silylchlorides used are either silicons derived from chemical wastes or are economically produced from monosilanes or disilanes. They are mixed with silicon powder and combusted with air to produce $H_2O$ and silicon nitride $Si_3H_4$, thereby generating power. The silicon nitride is converted to ammonia $NH_3$ under alkaline conditions, thereby producing silicates. Part of the $NH_3$ is converted to follow-on products, the major portion however is combusted with air to produce $H_2O$ and $N_2$, thereby generating power. The $N_2$ cycle is thereby closed.

U.S. Pat. No. 5,996,332 discloses a method of driving a shaft by reaction of silanes with air in a double combustion chamber and an associated drive mechanism. The hydrogen of the silanes reacts in the first combustion chamber with an insufficient level of oxygen of the air supplied, thereby producing high temperatures. At these high temperatures, the nitrogen from the air supplied reacts with the silicon of the silane to form silicon nitride. The resultant combustion gases and dust and the non-combusted hydrogen are mixed in the second combustion chamber with a large quantity of cold compressed air. The hydrogen undergoes late burning, and mixture subsequently enters a turbine chamber to actuate turbine blades connected to a shaft. The method is particularly environmentally-friendly since no toxic or polluting waste gases are produced.

U.S. Pat. No. 6,736,069 discloses method for generating energy by using exothermic reaction of a metal. The method consists of the following steps: reacting an oxidant containing mostly water with combustion substances mainly containing light metals to generate hydrogen; reacting generated hydrogen with nitric acid, sulfuric acid, chlorine peroxide, metal nitrate, metal perchlorate, metal sulfate, and hydrogen peroxide to generate water and heat; and continuously repeating the above two steps with the use of water to gradually increase explosive power. A method for utilizing generated energy is also disclosed. The method can generate increased amounts of energy by repeatedly reacting oxidants such as water, liquid acid, and metal salt with combustion substances containing mostly light metals. According to the inventor, this method has economic advantages in that inexpensive substances such as light metal and oil are used as combustion substances.

U.S. Pat. No. 5,178,844 discloses a method and for producing a product comprising a nitride compound, such as for example silicon nitride. A reactor is provided which has a chamber defined therein which is divided into a combustion zone and a reaction zone. A combustible mixture is injected into the combustion zone in a direction generally toward the reaction zone, and is accordingly combusted in the combustion zone. At least one reactant is injected at the boundary between the zones into the reactor chamber in a direction generally parallel to the longitudinal axis of the chamber so as to react to from raw product comprising the nitride compound. A raw product powder as produced by the reactor comprises silicon nitride as the nitride compound and further comprises elemental silicon.

SUMMARY

The following summary is provided to introduce the reader to the more detailed discussion to follow. The summary is not intended to limit or define the claims.

Processes for generating energy are described herein. The processes are chemical processes for generating energy, and comprise a series of chemical reactions, at least some of which are exothermic. The energy generated by the exothermic reactions may be captured by any method known in the art, for example by the use of Stirling engines. The captured energy may be, for example, sold to consumers. In addition, the process may comprise certain steps which are endothermic. The captured energy may be input into these endothermic steps. Accordingly, in some examples, the process may not require any energy from outside of the process. Preferably, the processes are cyclic processes, in which at least some of the products of the process are processed and recycled back to the start of the process.

According to one broad aspect, a process for generating energy is provided. The process comprises a) exothermically reacting Mg with $SiO_2$ to yield at least $Mg_2Si$ and Si; b) reacting the $Mg_2Si$ to yield at least lower silanes, and at least one magnesium product; c) generating at least higher silanes from at least a portion of the lower silanes; and d) combusting the higher silanes and the Si to yield at least one silicon product.

Preferably, the process further comprises processing at least a portion of the magnesium product to yield Mg, and recycling at least a portion of the Mg back to step (a).

According to another broad aspect, another process for generating energy is provided. The process comprises a) exothermically reacting Mg with $SiO_2$ to yield at least $Mg_2Si$ and Si; b) reacting the $Mg_2Si$ with $H_2$ to yield at least lower silanes, and Mg; c) generating at least higher silanes from the lower silanes; and d) combusting the higher silanes and the Si to yield at least one silicon product.

Preferably, the process further comprises recycling at least a portion the Mg yielded in step (b) back to step (a).

According to another broad aspect, another process for generating energy is provided. The process comprises (a) exothermically reacting Mg with $SiO_2$ to yield at least $Mg_2Si$ and Si; (b) reacting the $Mg_2Si$ to yield at least lower silanes, and at least one magnesium product; and (c) combusting at least a portion of the lower silanes.

DRAWINGS

DESCRIPTION OF VARIOUS EXAMPLES

Various processes will be described below to provide an example of each claimed invention. No example described below limits any claimed invention and any claimed invention may cover processes that are not described below. The claimed inventions are not limited to processes having all of the features of any one process described below or to features common to multiple or all of the processes described below. It is possible that a process described below is not an example of any claimed invention. The applicants, inventors or owners reserve all rights that they may have in any invention disclosed in a process described below that is not claimed in this document, for example the right to claim such an invention in a continuing application and do not intend to abandon, disclaim or dedicate to the public any such invention by its disclosure in this document.

Figure 1:
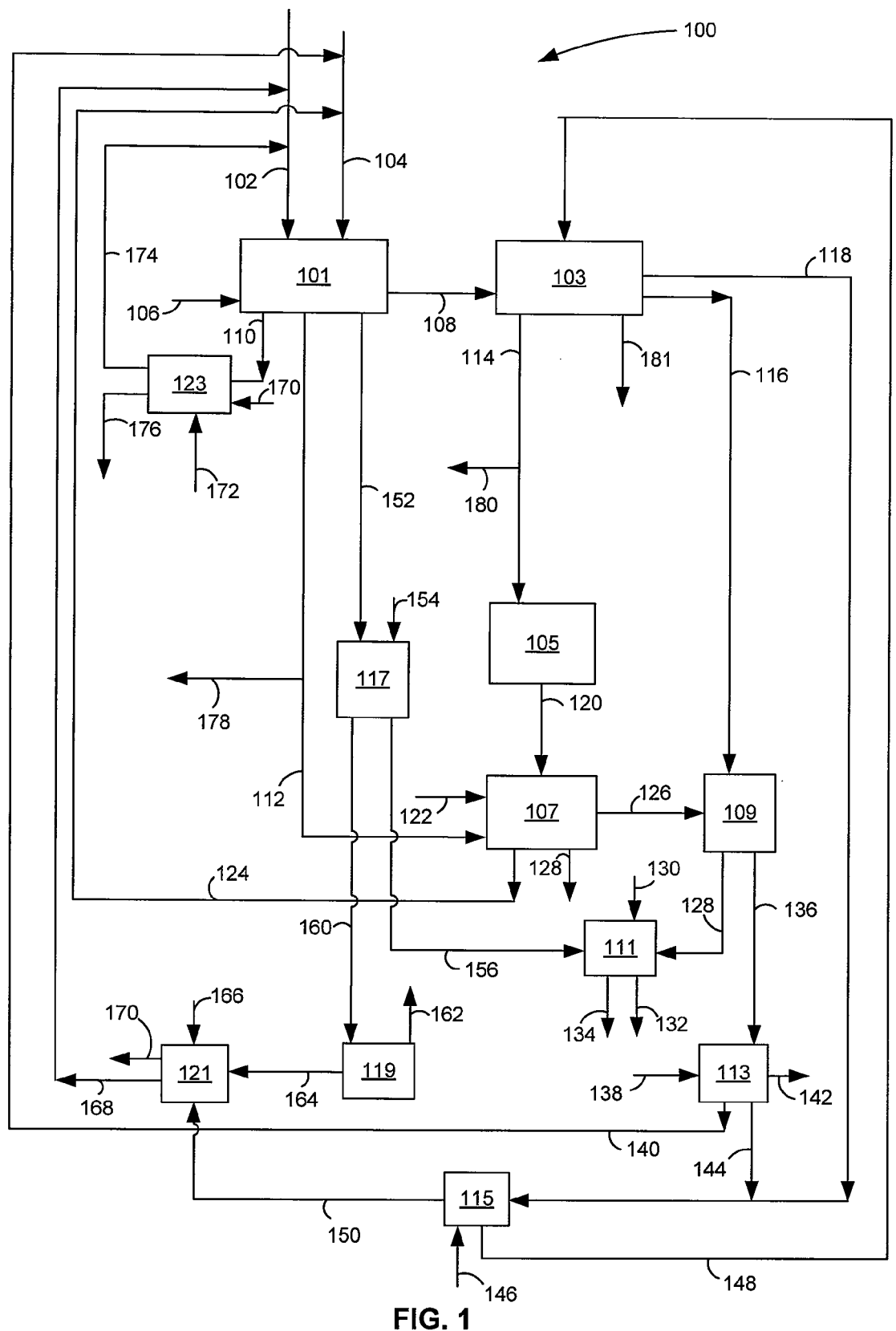
FIG. 1 is a flow diagram of an example of a process in accordance with the present invention.

Referring to the flow chart of FIG. 1, a first example of a process 100 is shown. Process 100 is a process for generating energy, and comprises a series of chemical reactions, at least some of which are exothermic. The energy generated by the exothermic reactions may be captured by any method known in the art, for example by the use of Stirling engines. The captured energy may be, for example, sold to consumers. In addition, the process may comprise some steps which are endothermic. At least a portion of the captured energy may be input into these endothermic steps. Furthermore, process 100 is preferably a cyclic process, in which at least some of the products of the process are processed and recycled back to the start of the process. The products of the various reactions in the process may be separated from each other using any suitable method, such as centrifugation or filtration.

Step 101

Process 100 starts at step 101. The starting materials for step 101 are Mg (line 102), and SiO$_2$ (line 104). At step 101, Mg and SiO$_2$ are reacted exothermically to yield at least Mg$_2$Si and Si. In the example shown, the reaction of Mg and SiO$_2$ further yields MgO. More particularly, the main reactions at step 101 may occur according to the following formulas:

$$4Mg + SiO_2 \rightarrow 2MgO + Mg_2Si \quad (1)$$

$$2Mg + SiO_2 \rightarrow 2MgO + Si \quad (2)$$

Reactions (1) and (2) may occur simultaneously. In the example shown, at step 101, Mg and SiO$_2$ react in the presence of a catalyst (line 106). The balance between reactions (1) and (2) may depend on the type and amount of catalyst present. In some examples, the catalyst may include copper oxide or iodine.

Both reactions (1) and (2) are exothermic. The energy generated by reaction 1 may be approximately 295.8 kJ/mol Mg$_2$Si. The energy generated by reaction 2 may be approximately 375 kJ/mol Si.

Additionally, the following reaction may occur at step 101:

$$Mg + Si \rightarrow Mg_2Si \quad (3)$$

Reaction (3) is exothermic, and may yield approximately 79.8 kJ/mol Mg.

Additionally, some Mg may combine with some SiO$_2$ to form other magnesium silicides such as MgSi, and Mg$_3$Si$_2$.

In some examples, step 101 is carried out in the presence of air, which contains O$_2$ and N$_2$. In such examples, at least some of the Mg may react with the O$_2$ to yield MgO, and at least some of the Mg may react with the N$_2$ to yield Mg$_3$N$_2$. These reactions may occur according to the following formulas:

$$2Mg + O_2 \rightarrow 2MgO \quad (4)$$

$$3Mg + N_2 \rightarrow Mg_3N_2 \quad (5)$$

Both reactions (4) and (5) are exothermic. The energy generated by reaction (4) may be approximately 601.5 kJ/Mol MgO. The energy generated by reaction (5) may be approximately 461.3 kJ/Mol Mg$_3$N$_2$.

Preferably, the Mg is provided to step 101 in the form of a powder comprising ultradispersed particles. For example, the particles may have an average diameter of less than 100 microns, and more specifically, between 70 microns and 1 micron. Alternately, the particles may be nanoparticles, having a diameter of less than 1 micron. The magnesium may contain small amounts of magnesium oxide, which may be present due to naturally occurring oxidation. Other contaminants may be present as well, such as Mg$_3$N$_2$. Preferably, the total contaminants do not exceed 0.01 wt % of the total weight of the Mg.

In some examples, the SiO$_2$ is provided in the form of granules, such as in the form of sand.

Preferably, the Mg is collected on a layer of SiO$_2$ granules, and the Mg and SiO$_2$ are provided together to step 101. Such examples may be advantageous because the risk of the Mg exploding may be reduced or minimized. In alternate examples, the Mg and the SiO$_2$ may be provided as a homogeneous mixture. In other alternate examples, the Mg and the SiO$_2$ may be provided separately to step 101, and may be mixed during step 101.

As will be described further hereinbelow, preferably at least some of the Mg provided to step 101 may be provided from steps further downstream in the process. For example, at least some of the Mg used in step 101 may be produced in steps 121 or 123, and recycled back to step 101. Preferably, between more than 90% of the Mg provided to step 101 is provided from downstream steps. However, in alternate examples, less than 90% of the Mg provided to step 101 is provided from downstream steps. Further, at least some of the SiO$_2$ may be recycled to step 101 from steps further downstream in the process.

Step 101 may be carried out in a vessel or container. In some examples, the vessel or container is capable of withstanding elevated reaction temperatures, is inert to the reactants and products of step 101, and is capable of conducting heat. More particularly, the vessel may be made from a metal, a metal oxide, or a metal alloy (e.g. aluminum, copper, ceramic, or a combination thereof). Such vessels are described in U.S. Pat. No. 5,178,844 (Carter et al.), and U.S. Pat. No. 6,436,356 (Koput); and U.S. Patent Application Publication 2003/0101850 (Vadchenko et al.).

The packing density of the vessel may vary. In some examples, 60% to 80% of the volume of the vessel may be filled by reactants, with the remaining portion filled with air. In alternate examples, step 101 may be carried out in a vacuum or in a nitrogen atmosphere.

Preferably, the Mg and the SiO$_2$ are provided to the vessel in a 3:1 mole ratio.

The reaction of Mg and SiO$_2$ may be carried out according to known methods for self-propagating high temperature synthesis. For example, the reaction may be initiated by providing a short term heat impulse (e.g., an electric spiral, laser, spark, etc.), such that a combustion wave is generated and spreads across the starting materials. The reaction can last from less than one second up to several minutes depending on the purity of the reactants. In some particular examples, the speed of the combustion wave is in the range of 0.1 to 20 cm/s. The temperature of combustion may be between 2300 to 3800 K. The energy needed to generate a spark or otherwise initiate a combustion may be between 10 and 200 cal/cm$^2$/sec.

The energy generated by the above reactions may be captured according to methods known in the art, for example using Stirling engines.

In one particular example, step 101 may be carried out starting with 6 mol of Mg and 2 Mol of $SiO_2$, which produces 1 mole of $Mg_2Si$ powder, 1 mol of Si, and 4 mol of MgO. Up to 0.24% of the Mg may react with oxygen and nitrogen in the air.

The resulting MgO may be in the form of a powder. The resulting $Mg_2Si$ may be in the form of a powder. The resulting Si may be in the form of an amorphous powder. The products may be separated and purified by known methods, such as centrifugation.

At least a portion of the $Mg_2Si$ yielded in step 101 is forwarded to step 103 (via line 108). The Si yielded in step 101 is forwarded to step 107 (via line 112). Optionally some of the Si yielded in step 101 may be removed from the process (via line 178) and may be used to generate solar power. That is, some of the Si may be converted to solar-grade Si, which may be incorporated into solar panels. The energy generated by the solar panels may be used to power steps of process 100 requiring energy, such as steps 115 and 119.

The MgO yielded in step 101 is optionally forwarded to step 123 (via line 110), and the $Mg_3N_2$ yielded in step 101 is optionally forwarded to step 117 (via line 152).

Step 103

At step 103, the $Mg_2Si$ produced in step 101 is reacted to yield at least lower silanes, and at least one magnesium product. As used herein, the term lower silanes includes silanes having less than three silicon atoms, including $SiH_4$ and $Si_2H_6$. In the example shown, the magnesium product includes $MgCl_2$ and $Mg(OH)_2$. More specifically, in the example shown, the $Mg_2Si$ is exothermically reacted with aqueous HCl to yield $MgCl_2$, $Mg(OH)_2$, $SiH_4$, $Si_2H_6$, and $H_2$. The reactions at step 103 may occur according to the following formulas:

$$Mg_2Si + 4HCl \rightarrow 2MgCl_2 + SiH_4 \quad (6)$$

$$Mg_2Si + 4H_2O \rightarrow 2Mg(OH)_2 + SiH_4 \quad (7)$$

The HCl is preferably a solution of between 0.1 to 5%. In alternate embodiments, another type of acid may be used.

Reaction (6) may be initiated by combining the reactants at room temperature. As reaction (6) occurs, the mixture becomes further heated, and as the mixture is further heated, reaction (7) occurs simultaneously with reaction (6).

Both reaction (6) and reaction (7) are exothermic. Reaction (6) may yield approximately 508.4 kJ/mol $SiH_4$, and reaction (7) may yield approximately 593.8 kJ/mol $SiH_4$.

During step 103, trace amounts of $H_2$ may be formed (line 181). The $H_2$ may be optionally forwarded to other steps in the process requiring $H_2$, such as step 121, discarded, or used for another suitable purpose.

Additionally, the higher magnesium silicides formed in step 101 may be forwarded to step 103 together with the $Mg_2Si$. At step 103, $Si_2H_6$ may be formed by the reaction of the higher magnesium silicides with the HCl. This may occur according to the following formula:

$$Mg_3Si_2 + 6HCl \rightarrow 3MgCl_2 + Si_2H_6 \quad (8)$$

The lower silanes generated at step 103 are gaseous, and may be separated from the remaining products by any suitable method, such as absorption or rectification.

At least a portion of the separated lower silanes are forwarded to step 105 (via line 114). For example, between 70% and 90% of the lower silanes are forwarded to step 105. Optionally, a portion of the lower silanes, for example 10% to 30% of the lower silanes, may be removed from the process (via line 180). The removed lower silanes may, for example, be combusted in order to generate energy required to power the endothermic steps of the process 10, or reacted to obtain Si and $H_2$.

Preferably, at least a portion of the magnesium products generated at step 103 are further processed to yield Mg, and are recycled back to step 101. For example, as will be described further hereinbelow, in the exemplified process, the $Mg(OH)_2$ is forwarded to step 109 for further processing (via line 116), and the $MgCl_2$ is forwarded to step 115 for further processing (via line 118).

Step 105

At step 105, higher silanes are generated from at least a portion of the lower silanes formed in step 103. For example, approximately 70% to 90% of the lower silanes yielded in step 103 may be forwarded to step 105 (via line 114). As used herein, the term higher silanes refers to silanes having more than 3 silicon atoms and of the formula $Si_xH_{2x+2}$. For example, the higher silanes may include from 3 to 9 or more silicon atoms (e.g. $Si_3H_8$ to $Si_9H_{20}$).

In some examples, the higher silanes may be generated according to known methods, such as those described in U.S. Pat. No. 6,027,705 (Kitsuno); Japanese unexamined patent publications (Kokai) 3-183613, 60-141613, 62-132720, 62-132721 and 3-183614; and German Patent No. 2139155.

In one particular example, step 105 comprises separating the gaseous lower silanes into monosilane $SiH_4$ and disilane $Si_2H_6$, for example by cooling the gaseous mixture below the condensation temperature of the disilane (i.e. below −14.8 degrees Celsius, optionally to about −20 degrees Celsius). Then, using a parallel-plate RF (13.56 MHz) discharge apparatus, such as that described in U.S. Pat. No. 6,562,690 (Cheung et al.), the gaseous monosilane is decomposed at 2.16 eV to yield $SiH_2$ and hydrogen, in accordance with the following formula:

$$e^- + SiH_4 \rightarrow SiH_2 + H_2 + e^- \quad (9)$$

In some examples, the energy generated in steps 101 and 103 may be used to power the discharge apparatus. Alternately, some of the $H_2$ may be removed and allowed to ignite to generate energy to power the discharge apparatus. Alternately, some of the silanes may be removed and allowed to ignite to power the discharge apparatus.

The isolated $Si_2H_6$ is then heated back to a gaseous state (e.g. to a temperature of between 300° C. and 400° C.), and the $SiH_2$ is reacted with the $Si_2H_6$ to yield higher silanes according to the following formulas:

$$SiH_2 + Si_2H_6 \rightarrow Si_3H_8 \quad (10)$$

$$SiH_2 + Si_nH_{2n+2} \rightarrow Si_{(n+1)}H_{[2(n+1)+2]} \quad (11)$$

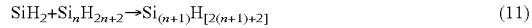

Reactions 10 and 11 are exothermic, and may generate approximately 233.6 kJ/mol. Reactions 10 and 11 may be carried out according to any suitable method, such as that described in "Polysilane Production in RF $SiH_4$ and $H_2$—$SiH_4$ Plasmas", by P. Horvath, K. Rozsa, and A. Gallagher, published in JILA, Univ. of Colorado and National Institute of Standards and Technology, June 2003.

The higher silanes generated in step 105 are forwarded to step 107 (via line 120).

Step 107

At step 107, the higher silanes generated in step 105 (line 120) are combusted with the Si generated in step 101 (line 112) to yield at least one silicon product. In the exemplified process, the combustion is carried out in the presence of air (line 122), and the silicon product includes $SiO_2$ and $Si_3N_4$. For higher silanes of the formula $Si_3H_8$, the reaction at step 108 may occur according to the following formula:

$$Si+Si_3H_8+3O_2+2N_2 \rightarrow SiO_2+Si_3N_4+4H_2O \quad (12)$$

Reactions similar to reaction (12) may occur for other higher silanes.

Additionally, some lower silanes may be combusted with the Si, according to the following formula:

$$3Si+SiH_4+2O_2+2N_2 \rightarrow SiO_2+Si_3N_4+2H_2O \quad (13)$$

Both reactions (12) and (13) are exothermic. Reaction (12) may yield approximately 4824 kJ/mol $Si_3H_8$. Reaction (13) may yield approximately 4196 kJ/mol $SiH_4$.

In one particular example, step 107 may be carried out in a combustion chamber. The combustion chamber is preferably heated to above 1300° C., and is preferably at a pressure of about 80 atm. Hot air may be introduced to the combustion chamber at a temperature of between 2500° C. and 3000° C. Preferably, in order to avoid the formation of nitrogen oxides, the Si is added to the combustion chamber before the air, and after the temperature is raised above 1300° C. The oxygen and nitrogen in the hot air may then spontaneously react with the silanes and silicon. Syntheses of $Si_3N_4$ occurs above 1300° C. The generated combustion gases and dusts may be fed to an afterburner chamber, into which compressed cold air is introduced. The introduced cold air may cause a combustion of excess $H_2$ to form water vapor.

Both the resulting $Si_3N_4$ and the $SiO_2$ may be solid. The resulting mixture of $Si_3N_4$ and $SiO_2$ may be separated according to known methods, for example centrifugation.

Optionally, the $SiO_2$ generated at step 107 is recycled back to step 101 (via line 124). The $Si_3N_4$ is optionally forwarded to step 109 (line 126). The resulting water (line 128) may optionally be forwarded to other steps in the process requiring water, discarded, or used for other purposes.

Step 109

At steps 109, 113, 115, and 121, at least a portion of the magnesium products formed in step 103 are further processed to yield Mg, and the Mg is recycled back to step 101.

At step 109, the $Mg(OH)_2$ formed in step 103 (line 116) is reacted with the $Si_3N_4$ formed in step 107 (line 126) to yield $Mg_2SiO_4$ and $NH_3$ (ammonia). The reactions at step 109 may occur according to the following formula:

$$Si_3N_4+6Mg(OH)_2 \rightarrow 3Mg_2(SiO_4)+4NH_3 \quad (14)$$

Reaction (14) is exothermic, and may yield approximately 2586.7 kJ/mol $Si_3N_4$.

In order to initiate the reaction the $Si_3N_4$ may be heated to a temperature of between about 1500° C. and 1800° C., and combined with the $6Mg(OH)_2$. The energy required to heat the $Si_3N_4$ may optionally be obtained from energy captured in steps 101, 103, or 105. Alternately, the energy required to heat the $Si_3N_4$ may be obtained from solar cells fabricated from Si yielded in step 101.

The temperature of the resulting mixture may be cooled, for example to 245° C. to yield $NH_3$ and crystals of $Mg(OH)_2$.

The $NH_3$ generated in step 109 is optionally forwarded to step 111 (via line 128). The $Mg_2(SiO_4)$ generated in step 109 is optionally forwarded to step 113 (via line 136).

Step 111

At step 111, the $NH_3$ is exothermically reacted with $O_2$ (line 130) to yield $H_2O$ and $N_2$. The reactions at step 111 may occur according to the following formula:

$$2NH_3+3O_2 \rightarrow 6H_2O+N_2 \quad (15)$$

Reaction (15) is exothermic, and may yield approximately 847.9 kJ/mol $NH_3$.

The $N_2$ generated in step 111 is gaseous, and may optionally be released to the environment (line 132). The $H_2O$ generated in step 111 (line 134) is vapor, and may optionally be forwarded to other steps in the process requiring water, discarded, or used for another suitable purpose.

Step 113

At step 113 the $Mg_2(SiO_4)$ produced in step 109 (line 136) is reacted with HCl (line 138) to yield $H_2O$, $MgCl_2$, and $SiO_2$. The reactions occurring at step 114 may occur according to the following formula:

$$2Mg_2(SiO_4)+4HCl \rightarrow SiO_2+2MgCl_2+2H_2O \quad (16)$$

Reaction (16) is endothermic, and may require approximately 976.0 kJ/mol $Mg_2(SiO_4)$.

Preferably, the HCl is at a concentration of between 5 wt % and 10 wt %, and is heated to between 30° C. and 60° C. In alternate examples, another acid may be used.

The $SiO_2$ generated in step 113 is optionally recycled back to step 101 (line 140). The $H_2O$ generated in step 111 (line 140) may optionally be forwarded to other steps in the process requiring water, discarded, or used for another suitable purpose. The $MgCl_2$ generated in step 113 is forwarded to step 115 (line 144). Optionally, some of the $MgCl_2$ may be removed form the cycle, and may optionally be used for other purposes outside of process 100.

Step 115

At step 115, the $MgCl_2$ formed in step 113 (line 144) as well as the $MgCl_2$ formed in step 103 (line 118) is reacted with $H_2O$ (line 146) to yield MgO, and HCl. The reactions occurring at step 115 may occur according to the following formulas:

$$MgCl_2+4H_2O \rightarrow MgCl_2.4H_2O \quad (17)$$

$$MgCl_2.4H_2O \rightarrow MgCl_2.2H_2O+2H_2O \quad (18)$$

$$MgCl_2.2H_2O \rightarrow MgCl_2.H_2O+H_2O \quad (19)$$

$$MgCl_2.H_2O \rightarrow MgO+2HCl \quad (20)$$

Reactions (17) to (20) are endothermic. Reaction (17) may require approximately 110.2 kJ/mol $MgCl_2$, reaction (18) may require about 71.0 kJ/mol $MgCl_2.4H_2O$, reaction (19) may require approximately 44.8 kJ/mol $MgCl_2.2H_2O$, and reaction (20) may require approximately 225.6 kJ/mol $MgCl_2.H_2O$. Reaction (17) may be initiated by mixing the $MgCl_2$ and $H_2O$ at room temperature. Reactions (18) and (19) may be initiated by heating the mixture to about 180° C. At about 90° C., reaction (18) may begin to occur. At about 120° C., reaction (19) may begin to occur. Preferably, the mixture is maintained below 200° C. while reactions (17) to (19) are occurring, in order to avoid the formation of $Mg_2OCl_2$. In order to initiate reaction (20) the mixture may be heated to 505° C.

The HCl produced in step 115 may optionally be forwarded to step 103 to be used as a reactant (via line 148). The MgO produced in step 115 is optionally forwarded to step 121 (via line 150).

Step 117

As mentioned hereinabove, in some examples, step 101 may be carried out in the presence of $N_2$, and at least some of the Mg may react with the $N_2$ to yield $Mg_3N_2$. The $Mg_3N_2$ may optionally be further processed to produce Mg, which can be forwarded back to step 101. For example, the $Mg_3N_2$ is forwarded to step 117 (via line 152). At step 117, the $Mg_3N_2$ is exothermically reacted with $H_2O$ (line 154) to yield $Mg(OH)_2$ and $NH_3$. The reactions at step 117 may occur according to the following formulas:

$$Mg_3N_2 + 6H_2O \rightarrow SiO_2 + 3Mg(OH)_2 + 2NH_3 \quad (21)$$

The $Mg(OH)_2$ yielded in reaction (21) may be solid, and the $NH_3$ may be gaseous. Reaction (21) is exothermic, and may yield approximately 449.0 kJ/mol $Mg_3N_2$.

The $NH_3$ yielded in step 117 is optionally forwarded to step 111 (via line 156), and reacted with $O_2$ to yield $H_2O$ and $N_2$ as described hereinabove.

The $Mg(OH)_2$ yielded in step 117 is optionally forwarded to step 119 (via line 160)

Step 119

At step 119, the $Mg(OH)_2$ yielded in step 117 is heated to yield MgO and $H_2O$. The reaction at step 119 may occur according to the following formula:

$$Mg(OH)_2 \rightarrow MgO + H_2O \quad (22)$$

Reaction (22) is endothermic, and may be initiated by heating the to $Mg(OH)_2$ to between about 330° C. to 450° C. Reaction (22) may require approximately 37.02 kJ/mol.

The $H_2O$ generated at step 119 (line 162) may optionally be used in other steps of the process requiring water, discarded, or used for another purpose.

The MgO generated at step 119 is optionally forwarded to step 121 (line 164).

Step 121

At step 121 the MgO yielded in step 119 (line 164), as well a the MgO yielded in step 115 (line 150), is reacted with $H_2$ (line 166) to yield $H_2O$, and Mg. The reactions at step 119 may occur according to the following formula:

$$MgO + H_2 \rightarrow Mg + H_2O \quad (23)$$

Reaction (23) is endothermic, and may require approximately 315.67 kJ/mol of energy. Reaction (23) may be initiated subjecting the reactants to a pressure of 2600 kBar. Over the course of the reaction, the reaction mixture may heat up, for example to a temperature of between 2000° C. to 2500° C.

The products may subsequently be cooled to about 200° C. Preferably the products are cooled in the presence of $SiO_2$, for example in the presence of $SiO_2$ recycled yielded in step 107, such that the Mg precipitates onto the $SiO_2$, to form particles comprising Mg on a layer of $SiO_2$ granules, as described with respect to step 101.

The Mg yielded in step 121 is optionally recycled back to step 101 (via line 168). The $H_2O$ generated at step 121 (line 170) may optionally be used in other steps of the process requiring water, discarded, or used for another purpose.

Step 123

As mentioned hereinabove, at step 101, some MgO is generated. The MgO yielded in step 101 is optionally forwarded to step 123 (line 110), where it is processed to generate Mg which is recycled back to step 101. In the exemplified process, the MgO is reacted with CaO (line 170), and FeSi (line 172), in a process similar to the Pidgeon process, as is known in the art. The reactions at step 123 may occur according to the following formulas:

$$FeSi + 2MgO + 2CaO \rightarrow 2Mg + Ca_2SiO_4 + Fe \quad (24)$$

Reaction (24) is endothermic, and may require approximately 221.1 kJ/mol FeSi. The reaction may be carried out in a retort, as is known in the art. The magnesium produced in step 123 is gaseous, and is preferably cooled and solidified, and recycled back to step 101 (line 174). The $Ca_2SiO_4$ (line 176) is optionally discarded, or used in any suitable manner.

Figure 2:
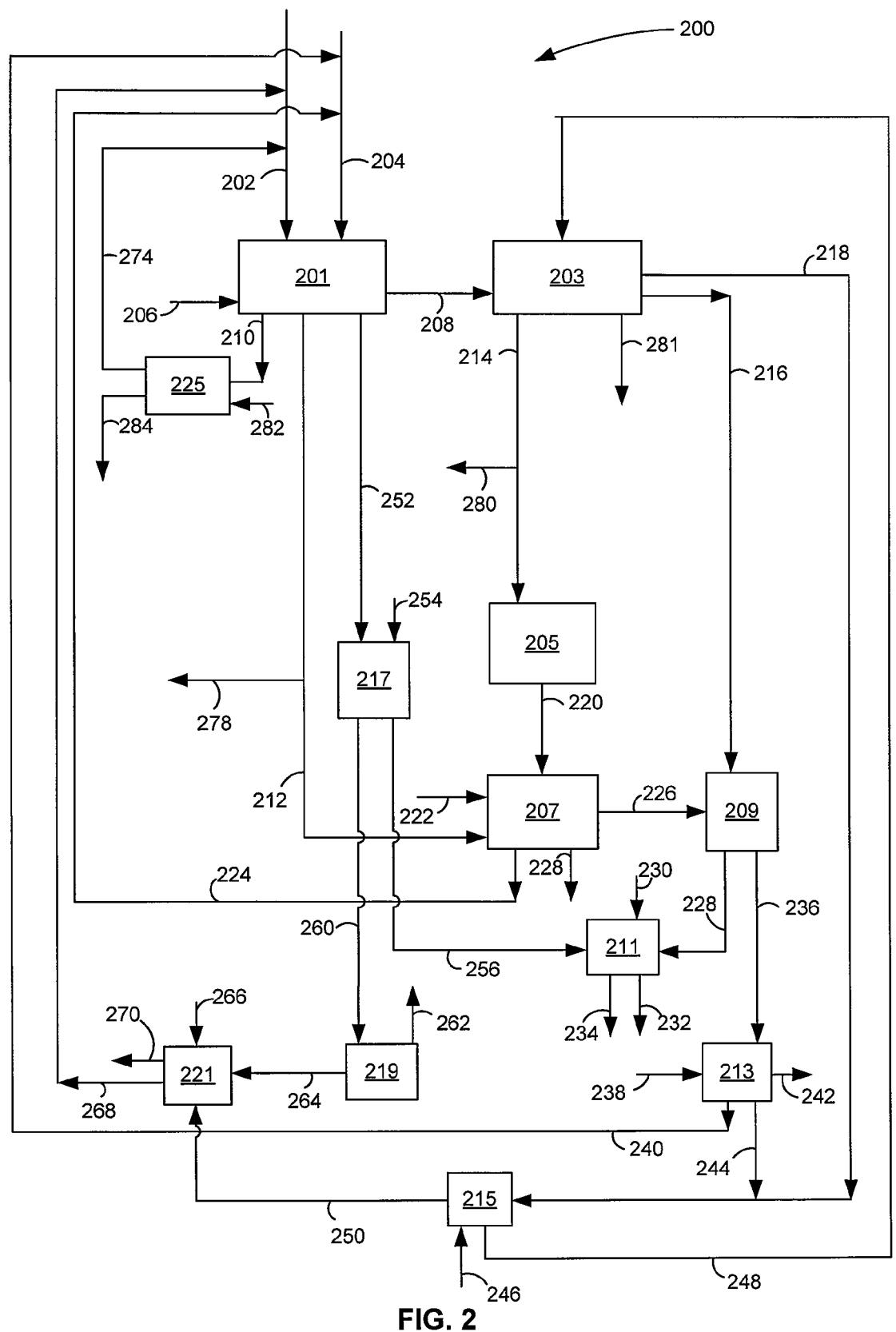
FIG. 2 is a flow diagram of another example of a process in accordance with the present invention.

An alternate example of a process 200 in accordance with the present invention is shown in FIG. 2. Process 200 is similar to process 100, and in FIG. 2, like numerals are used to refer to like elements in FIG. 1, with the first digit incremented to 2 to refer to the Figure number.

Step 225

Process 200 differs from process 100 in that step 225 replaces step 123. At step 225 the MgO yielded in step 201 (line 210) is processed to generate Mg, at least some of which is recycled back to step 201. In the exemplified process, step 225 comprises reacting the MgO with $H_2$ (line 282) to yield Mg and $H_2O$. At least some of the Mg is recycled back to step 201 (via line 274). The $H_2O$ (line 284) may optionally be discarded, forwarded to other steps in the process, or used in another suitable manner. Step 225 may be carried out as described hereinabove with respect to step 121.

Figure 3:
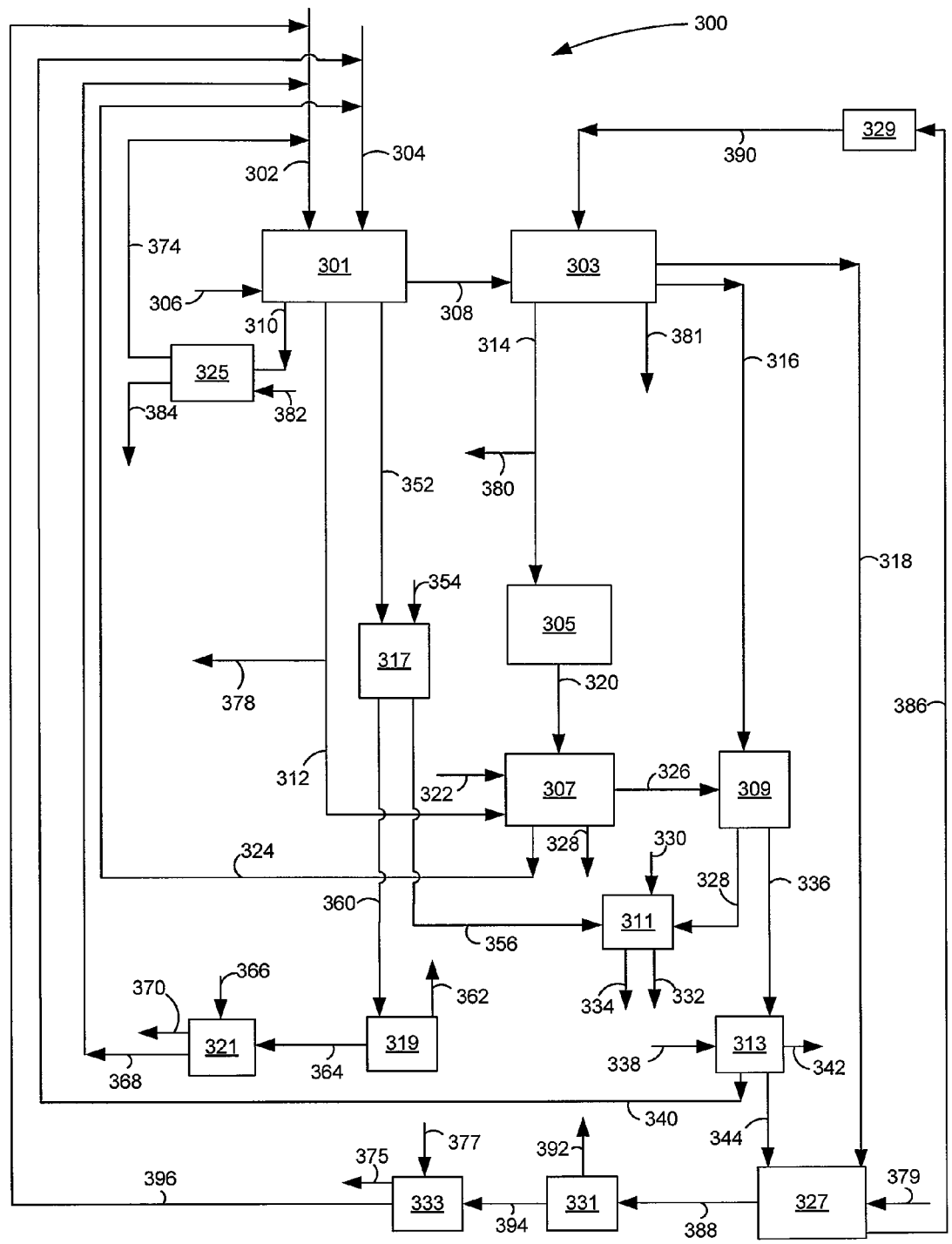
FIG. 3 is a flow diagram of yet another example of a process in accordance with the present invention.

An alternate example of a process 300 in accordance with the present invention is shown in FIG. 3. Process 300 is similar to process 100, and in FIG. 3, like numerals are used to refer to like steps in FIG. 1, with the first digit incremented to 3 to refer to the Figure number.

Step 327

Process 300 differs from process 100 in that step 115 is omitted. Instead, the $MgCl_2$ yielded in step 313 (line 344) and the $MgCl_2$ yielded in step 303 (line 318) is forwarded to step 327. At step 327, the $MgCl_2$ is reacted with NaOH (line 379) to yield $Mg(OH)_2$ and NaCl. The reactions at step 327 may occur according to the following formulas:

$$MgCl_2 + 2NaOH \rightarrow 2NaCl + Mg(OH)_2 \quad (25)$$

Reaction (25) is exothermic, and may yield approximately 250.8 kJ/mol $MgCl_2$.

The NaCl yielded in step 327 is optionally forwarded to step 329 (line 386). The Mg yielded in step 327 is optionally forwarded to step 331 (line 388).

Step 329

At step 329, the NaCl yielded in step 329 is processed to yield HCl, as is known in the art. The HCl may optionally be forwarded to step 303 (line 390) to be used as a reactant.

Step 331

At step 331, the $Mg(OH)_2$ generated in step 329 is heated to yield $H_2O$ and MgO. Step 331 may be carried out as described hereinabove with respect to step 119.

The $H_2O$ yielded in step 331 (line 392) may optionally be forwarded to another step in the process requiring water, discarded, or used in another suitable manner.

The MgO yielded in step 331 is forwarded to step 333 (via line 394).

Step 333

At step 333, the MgO yielded in step 331 (line 394) is reacted with $H_2$ (line 377) to yield $H_2O$ and Mg. Step 333 may be carried out as described hereinabove with respect to step 121.

The Mg generated at step 333 may be recycled back to step 301 (line 396). The $H_2O$ (line 375) may optionally be forwarded to another step in the process requiring water, discarded, or used in another suitable manner.

Figure 4:
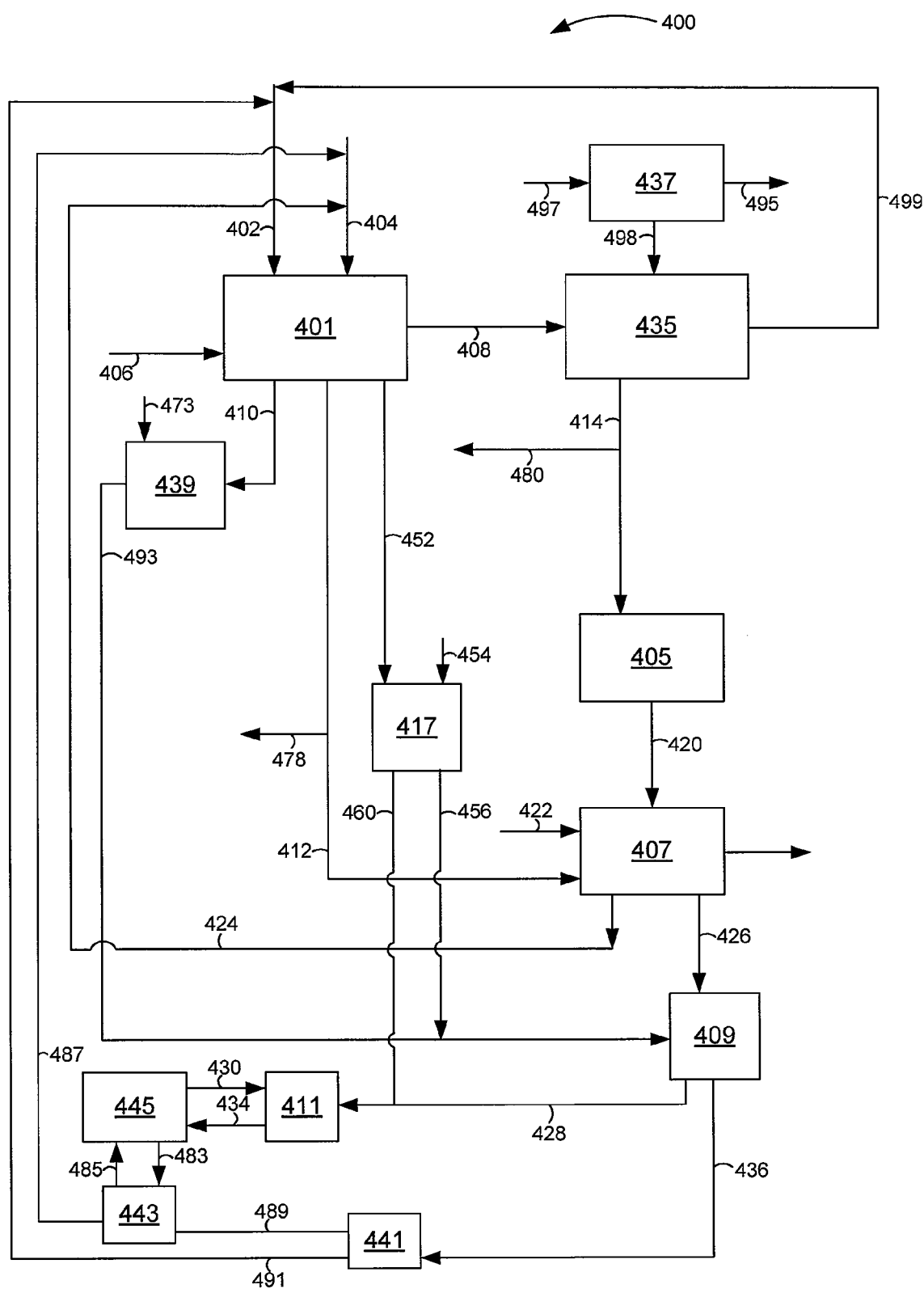
FIG. 4 is a flow diagram of yet another example of a process in accordance with the present invention.

An alternate example of a process 400 in accordance with the present invention is shown in FIG. 4. Process 400 is similar to process 100, and in FIG. 4 like numerals are used to refer to like steps in FIG. 1, with the first digit incremented to 4 to refer to the Figure number.

Step 435

Process 400 differs from process 100 in that step 435 replaces step 103. At step 435, the Mg$_2$Si generated in step 401 (line 408) is reacted with H$_2$ (line 498) to yield lower silanes. The reactions at step 435 may occur according to the following formulas:

$$Mg_2Si + 2H_2 \rightarrow 2Mg + SiH_4 \qquad (26)$$

Reaction (26) is endothermic, and may require approximately 684 kJ/mol SiH$_4$. In order to initiate reaction (26), the reactants may be mixed and heated to approximately 651° C.

Preferably, at least a portion of the Mg yielded in step 435 is recycled back to step 401 (line 499). The lower silanes are forwarded to step 405, as described with respect to step 105.

Step 437

Optionally, as shown, the H$_2$ provided to step 435 may be formed at step 437 by the electrolysis of water (line 497), as is known in the art, to yield H$_2$ (line 498) and O$_2$ (line 495). The energy required for this step may optionally be taken from any of the exothermic steps in the process, or may be generated by solar cells fabricated from Si yielded in step 101.

Step 439

Process 400 additionally differs from process 100 in that step 439 replaces step 123. At step 439, the MgO yielded in step 401 (line 410) is reacted with H$_2$O (line 473) to yield Mg(OH)$_2$. The reactions at step 439 may occur according to the following formula:

$$MgO + H_2O \rightarrow Mg(OH)_2 \qquad (27)$$

Reaction (27) is exothermic, and may yield approximately 608.68 kJ/mol.

The Mg(OH)$_2$ formed in step 439 is forwarded to step 409 (line 493), and is reacted with Si$_3$N$_4$ as described with respect to step 109.

Step 441

Process 400 additionally differs from process 100 in that step 441 replaces step 113. At step 441, the Mg$_2$SiO$_4$ yielded in step 409 (line 436) is heated to yield MgO, and SiO$_2$. The reactions at step 441 occur according to the following formula:

$$Mg_2SiO_4 \rightarrow 2MgO + SiO_2 \qquad (28)$$

Reaction (28) is endothermic and may require 63.2 kJ/mol Mg$_2$SiO$_4$. The reaction may be initiated by heating the starting product to 827° C. to 927° C.

The SiO$_2$ generated in step 441 may be recycled back to step 401 (line 491). The MgO may be forwarded to step 443 (line 489).

Step 443

At step 443, the MgO generated in step 441 is reacted with H$_2$ (line 483) to yield Mg and H$_2$O, as is described with respect to step 121.

The Mg generated at step 443 is recycled back to step 401 (line 487). The H$_2$O is optionally forwarded to step 445 (line 485).

Step 445

At step 445, the H$_2$ required for step 443 (line 483), and the O$_2$ required for step 411 (line 430) is cyclically generated. That is, the H$_2$O generated in step 443 (line 485) and the H$_2$O generated in step 411 (line 434) are forwarded to step 445. At step 445, the H$_2$O undergoes an electrolysis process, as is known in the art, to yield H$_2$ and O$_2$. The H$_2$ is forwarded back to step 443 (line 483), and the O$_2$ is forwarded back to step 411 (via line 430).

As mentioned hereinabove, in any of the above examples, a portion of the lower silanes, for example 10% to 30% of the lower silanes, may be removed from the process (via line 180) and may be combusted in order to generate energy. In an alternate example, all of the lower silanes may be combusted in order to generate energy. That is, the process may comprise step 101, 103, and a step of combusting the lower silanes generated in step 103.

It will be appreciated that in alternate examples, the further processing and recycling steps may be omitted.

It will be appreciated that in alternate examples, the products of the steps described hereinabove may be processed in another manner. For example, at any time in the process, a portion of the products may be removed from the process. For example, some of the MgCl$_2$ generated in step 103 may be removed and sold.

It will be appreciated that the energy generated in any of the exothermic steps of the process may be used to power any of the endothermic steps of the process or to initiate any of the exothermic steps of the process. Alternately, energy may be obtained from a source outside the process to power any of the endothermic steps of the process or to initiate any of the exothermic steps of the process. Alternately, any of the silicon generated in the process may be used to make solar cells, and solar energy generated by the solar cells may be used to power any of the endothermic steps of the process or to initiate any of the exothermic steps of the process.

It is envisioned that in alternate examples, rather than Mg, another alkaline earth metal, such as Mg, Ca, Be, Sr, Ba, or Ra may be used

The invention claimed is:

1. A process for generating energy comprising:
   a) exothermically reacting Mg with SiO$_2$ to yield at least Mg$_2$Si and Si;
   b) reacting the Mg$_2$Si to yield at least lower silanes, and at least one magnesium product;
   c) generating at least higher silanes from at least a portion of the lower silanes; and
   d) combusting the higher silanes and the Si to yield at least one silicon product.

2. The process of claim 1, wherein step (a) further yields a second magnesium product, and the process further comprises:
   e) processing at least a portion of the second magnesium product and/or the magnesium product produced in step (b) to yield Mg, and recycling at least a portion of the Mg back to step (a).

3. The process of claim 2, further comprising inputting at least a portion of the energy generated in steps (a) and (d) in to the further processing of step (e).

4. The process of claim 2, wherein:
   i) step (b) comprises reacting the Mg$_2$Si with HCl to yield the lower silanes, H$_2$, and the magnesium product, wherein the magnesium product produced in step (b) comprises a first amount of MgCl$_2$, and a first amount of Mg(OH)$_2$
   ii) the at least one silicon product comprises Si$_3$N$_4$;
   iii) the further processing of step (e) of the magnesium product produced in step (b) comprises exothermically reacting the first amount of Mg(OH)$_2$ with the Si$_3$N$_4$ to yield Mg$_2$SiO$_4$, and a first amount of NH$_3$.

5. The process of claim 4, wherein:
   1) step (a) is carried out in the presence of N$_2$, and at least a portion of the Mg reacts with the N$_2$ to yield Mg$_3$N$_2$; and 2) the process further comprises exothermically reacting the $Mg_3N_2$ with $H_2O$ to yield a second amount of $NH_3$, and a second amount of $Mg(OH)_2$.

6. The process of claim 5, further comprising exothermically reacting the first amount of $NH_3$ and the second amount of $NH_3$ with $O_2$ to yield $H_2O$, and $N_2$.

7. The process of claim 5, further comprising:
heating the second amount of $Mg(OH)_2$ to yield MgO;
reacting the MgO with $H_2$ to yield $H_2O$ and Mg; and
recycling the Mg back to step (a).

8. The process of claim 4, wherein the further processing of step (e) of the magnesium product produced in step (b) further comprises:
treating the $Mg_2SiO_4$ with HCl to yield $H_2O$, a second amount of $MgCl_2$ and $SiO_2$;
reacting the first amount of $MgCl_2$ and the second amount of $MgCl_2$ with $H_2O$ to yield at least MgO; and
reacting the MgO with $H_2$ to yield at least some of the Mg.

9. The process of claim 8, further comprising recycling the $SiO_2$ back to step (a).

10. The process of claim 4, wherein the further processing of step of the magnesium product produced in step (b) comprises:
reacting the $Mg_2SiO_4$ with HCl to yield $H_2O$, a second amount of $MgCl_2$ and $SiO_2$;
exothermically reacting the first amount of $MgCl_2$ and the second amount of $MgCl_2$ with NaOH to yield $Mg(OH)_2$, and NaCl;
heating the $Mg(OH)_2$ to yield MgO; and
reacting the MgO with $H_2$ to yield $H_2O$ and at least some of the Mg.

11. The process of claim 10, further comprising processing the NaCl to yield at least some of the HCl used in step (b).

12. The process of claim 2, wherein step (e) comprises recycling greater than 90% of a total Mg amount back to step (a).

13. The process of claim 1, wherein the silicon product comprises $SiO_2$, and the process further comprises recycling at least a portion of the $SiO_2$ back to step (a).

14. The process of claim 1, wherein the lower silanes comprise at least $SiH_4$ and $Si_2H_6$.

15. The process of claim 14, wherein the higher silanes are of the formula $Si_nH_{2n+2}$, wherein n is at least 3.

16. The process of claim 15, wherein step (c) comprises decomposing the $SiH_4$ to yield $SiH_2$, and reacting the $SiH_2$ with the $Si_2H_6$ to yield the higher silanes.

17. The process of claim 1, wherein the reaction of Mg and $SiO_2$ further yields MgO, and the process further comprises processing the MgO to yield at least some of the Mg used in step (a).

18. The process of claim 17, wherein processing the MgO comprises reacting the MgO with $H_2$ to yield $H_2O$ and at least a portion of the Mg used in step (a).

19. A process for generating energy comprising:
a) exothermically reacting Mg with $SiO_2$ to yield at least $Mg_2Si$ and Si;
b) reacting the $Mg_2Si$ with $H_2$ to yield at least lower silanes, and Mg;
c) generating at least higher silanes from the lower silanes; and
d) combusting the higher silanes and the Si to yield at least one silicon product.

20. The process of claim 19, further comprising:
e) recycling at least a portion the Mg yielded in step (b) back to step (a).

21. The process of claim 19, wherein the silicon product comprises $SiO_2$, and the process further comprises recycling at least a portion of the $SiO_2$ yielded in step (d) back to step (a).

22. A process for generating energy comprising:
a) exothermically reacting Mg with $SiO_2$ to yield at least $Mg_2Si$ and Si;
b) reacting the $Mg_2Si$ to yield at least lower silanes, and at least one magnesium product; and
c) combusting at least a portion of the lower silanes.

* * * * *